A. R. BEIERSDORF.
VALVE SPRING COMPRESSOR.
APPLICATION FILED SEPT. 22, 1915.

1,164,452.

Patented Dec. 14, 1915.

August R. Beiersdorf
INVENTOR.

BY
ATTORNEYS.

UNITED STATES PATENT OFFICE.

AUGUST R. BEIERSDORF, OF EVANSTON, ILLINOIS.

VALVE-SPRING COMPRESSOR.

1,164,452.

Specification of Letters Patent.   Patented Dec. 14, 1915.

Application filed September 22, 1915.   Serial No. 52,085.

*To all whom it may concern:*

Be it known that I, AUGUST R. BEIERSDORF, a citizen of the United States, residing at Evanston, in the county of Cook and State of Illinois, have invented certain new and useful Improvements in Valve-Spring Compressors, of which the following is a specification.

This invention relates to tools for compressing the valve springs of internal-combustion engines when making repairs to the valves, and its object is to provide a simple and efficient tool of this kind which can be readily applied and removed, and which is easy to operate.

With the herein stated object in view, the invention consists in a novel combination and arrangement of parts to be hereinafter described and claimed, and in order that the same may be better understood, reference is had to the accompanying drawing, in which—

Figure 1:
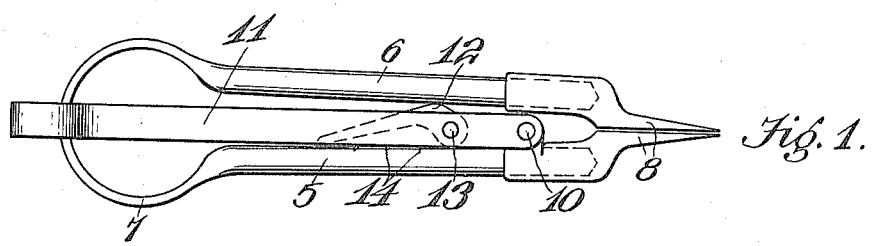
Figure 2:
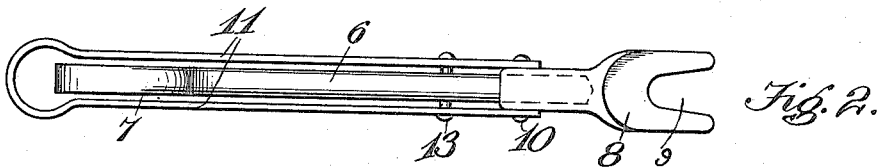
Figure 3:
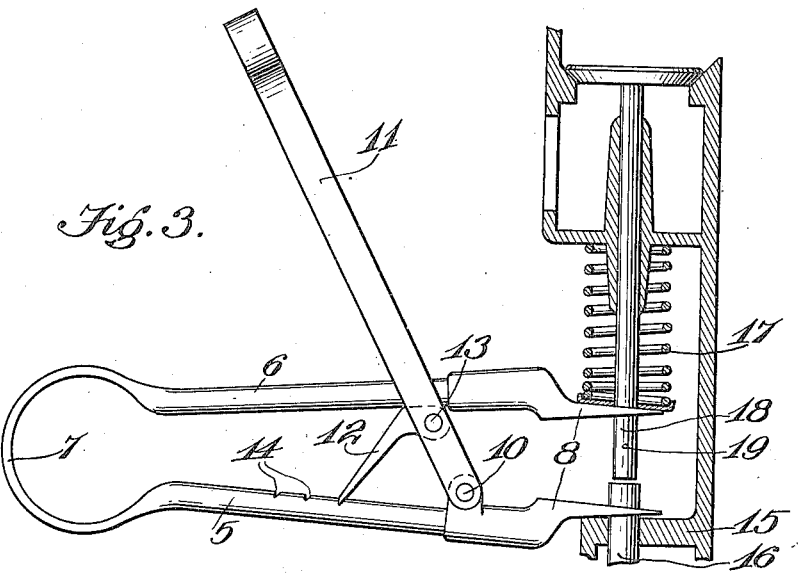

Figure 1 is a side elevation of the tool closed up; Fig. 2 is a plan view thereof, and Fig. 3 is a side elevation showing the tool applied to the valve.

Referring specifically to the drawing, the tool comprises two opposite arms 5 and 6, respectively, connected at one end by a spring bow 7. The free ends of the arms are equipped with jaw pieces 8 which are slotted as indicated at 9 or bifurcated, so that they may straddle the parts to be operated on. The jaw pieces may be integral with the arms, or separate and attached thereto in any approved manner.

To the arm 5, on its jaw piece 8, is fulcrumed, as indicated at 10, a lever 11 which is in the form of a yoke so that it may straddle the arm 5 and also the arm 6. Adjacent to its fulcrum, the lever carries a pivoted dog 12, the same being pivoted between the lever or yoke branches, as indicated at 13. The dog is so located on the lever that it works between the arms 5 and 6, the former having notches 14 in its top edge in any one of which the free end of the dog is adapted to seat.

The arms 5 and 6 are normally closed together by the spring bow 7, and when in this position, the dog 12 lies between the arms, and the lever 11 straddles the arms, as shown in Figs. 1 and 2. The tool therefore folds into small and compact form when not in use. It will be noted that the dog is somewhat angular so that its back seats against the bottom edge of the arm 6 and its free end engages the notched top edge of the arm 5. If now the lever is swung upward, the arm 6 is pried upward by the pressure of the dog 12 thereagainst, and as the arm 6 rises, the free end of the dog slips along the notched edge of the arm 5. When the dog enters one of the notches, the lever may be released without danger of the arm 6 swinging down, the dog locking said arm. It will therefore be seen that the dog acts not only as an abutment for swinging the arm 6 away from the arm 5, but also serves as a lock for locking the lever and thus holding the arm 6 in this position.

In operation, the jaw piece 8 of the arm 5 is placed on top of the guide 15 of the valve-operating rod 16 so as to straddle said rod. This places the jaw piece of the arm 6 beneath the valve spring 17, and straddling the valve stem 18. The lever 11 is now swung upward as shown in Fig. 3, whereupon the arm 6 swings upward as hereinbefore described, its jaw piece compressing the spring so as to release the key 19 and permit the key and valve to be removed with ease.

I claim:—

1. A tool of the character described, comprising two opposite arms flexibly connected at one end and having jaws at their free ends, a lever fulcrumed to one of the arms, and a pivoted abutment carried by the lever and engaging the other arm for prying the same away from the first-mentioned arm, said first-mentioned arm having locking notches engageable by the abutment for locking the lever.

2. A tool of the character described, comprising two opposite arms flexibly connected at one end and having jaws at their free ends, a lever fulcrumed to one of the arms, said lever being in the form of a yoke and straddling the arms, and a pivoted abutment carried by the yoke between the branches thereof, said abutment being located between the arms and engageable with the other arm for prying the same away from the first-mentioned arm, said first-mentioned arm having locking notches engageable by the abutment for locking the lever.

In testimony whereof I affix my signature.

AUGUST R. BEIERSDORF.

Copies of this patent may be obtained for five cents each, by addressing the "Commissioner of Patents, Washington, D. C."